United States Patent
Lehmann et al.

(10) Patent No.: US 9,632,742 B2
(45) Date of Patent: Apr. 25, 2017

(54) ADAPTIVE DESIGN EDITOR FOR WEB APPLICATIONS

(75) Inventors: Doron Lehmann, Kfar Vradim (IL); Nimrod Barak, Nes Tziona (IL); Eyal Nathan, Tel-Aviv (IL)

(73) Assignee: SAP SE, Walldorf (DE)

( * ) Notice: Subject to any disclaimer, the term of this patent is extended or adjusted under 35 U.S.C. 154(b) by 629 days.

(21) Appl. No.: 13/488,790

(22) Filed: Jun. 5, 2012

(65) Prior Publication Data

US 2013/0326433 A1    Dec. 5, 2013

(51) Int. Cl.
*G06F 3/14*      (2006.01)
*G09G 5/14*      (2006.01)
*G06F 9/44*      (2006.01)
*G06F 17/21*     (2006.01)
*G06F 3/0481*    (2013.01)

(52) U.S. Cl.
CPC .......... *G06F 3/1462* (2013.01); *G09G 5/14* (2013.01); *G06F 3/0481* (2013.01); *G06F 3/14* (2013.01); *G06F 9/4443* (2013.01); *G06F 17/212* (2013.01); *G06F 17/217* (2013.01); *G09G 2340/145* (2013.01); *G09G 2370/04* (2013.01)

(58) Field of Classification Search
USPC ....... 715/800, 798, 252, 253, 793, 240, 788, 715/238, 864, 251, 794, 815, 866
See application file for complete search history.

(56) References Cited

U.S. PATENT DOCUMENTS

| | | | |
|---|---|---|---|
| 2006/0010390 A1* | 1/2006 | Guido et al. | 715/742 |
| 2006/0015846 A1* | 1/2006 | Fraleigh et al. | 717/109 |
| 2010/0056127 A1* | 3/2010 | Osborne et al. | 455/418 |
| 2011/0276893 A1* | 11/2011 | Yambal et al. | 715/745 |
| 2012/0131437 A1* | 5/2012 | Zhu | 715/234 |

OTHER PUBLICATIONS

D. Scott Brandt, Digital Presentation: Make Your Delivery Effective, May 1998, Computers in Libraries, pp. 35-39.*
Roman H. Kepczyk, A View Into Future Display Technologies, Jul./Aug. 2005, Infotech Update, pp. 8-9.*

* cited by examiner

*Primary Examiner* — Linh K Pham
*Assistant Examiner* — Tam Tran
(74) *Attorney, Agent, or Firm* — Buckley, Maschoff & Talwalkar LLC

(57) ABSTRACT

According to some embodiments, a method and apparatus are provided to receive an application type and a platform environment type. An application based on the received application type and the platform environment type is created. The application comprises an instantiation of the received application type configured for the received environment type.

8 Claims, 7 Drawing Sheets

100

Determining an adjustment to an iView to be displayed on a mobile device
101

Modifying the iview based on the determined adjustment.
102

| Priority 702 | iView 704 | Level of Mobile Detail 706 | User Role 708 |
|---|---|---|---|
| 1 | 201 | 209 | Manager A |
| 1 | 201 | 212 | Manager D |
| 2 | 202 | 202 | Manager A |

ADAPTIVE DESIGN EDITOR FOR WEB APPLICATIONS

BACKGROUND

A web portal is a web site that combines information from a variety of different sources in a single web page. Typically, each information source is associated with a dedicated area on a web portal for displaying information and each dedicated area may be associated with a web browser frame.

Many users view web pages via a mobile device (e.g., tablet or cellular phone). However, viewing and interacting with a web page portal that includes a variety of web browser frames can be difficult to view on a mobile device. In these instances, users may need to scroll up/down or right/left on their mobile device to view pertinent information. Not only does this make viewing a web portal difficult, but also time consuming.

BRIEF DESCRIPTION OF THE DRAWINGS

FIG. 7 illustrates a portion of a database that might be stored in accordance with some embodiments.

DETAILED DESCRIPTION

In some embodiments, a web browser frame may comprise an iView. An iView may be defined as any kind of application, information or service that can be visualized in a Web browser frame. iViews may comprise self-contained web documents that are provided via a Uniform Resource Locator (URL) and are managed by a web portal framework. An iView may lead directly to a website but an iView offers some content to users to fulfill its reason for purpose within its allotted space in the web browser frame. iViews may be linked such that when making a change in a first iView, content in a second iView may be changed based on the change in the first iView.

Figure 1:
FIG. 1 illustrates a method according to some embodiments.

Referring now to FIG. 1, an embodiment of a method 100 is illustrated. The method 100 may be embodied on a non-transitory computer-readable medium. Furthermore, the method 100 may be performed by an apparatus such as, but not limited to, the apparatus of FIG. 4. The method 100 may relate to managing iViews being viewed via a mobile device.

At 101, an adjustment to an iView to be displayed on a mobile device is determined. In some embodiments, determining comprises determining the mobile device's screen resolution. This may be accomplished by a media query which returns a screen resolution of the device accessing the portal. Media queries may be associated with a cascading style sheet ("CSS") such as CSS3. Once a screen resolution of the device accessing the portal is determined, the iView content and/or a size of the iView itself may be adjusted based on the determined mobile device screen resolution. In one embodiment, a portion of the iView that is displayed to a user may be removed based on the resolution. In another embodiment, a portion of the iView that is displayed to a user may be removed based on a role of the user. In yet another embodiment, a portion of the iView that is displayed to a user may be removed based on the resolution and a role of the user.

A user may need to login or authenticate to a web portal that displays iViews by using his/her mobile device. After the user is authenticated, and once a resolution is received, a system may query a data source associated with the portal to determine rules associated with the user accessing the web portal.

Furthermore the system may query a set of rules associated with content that a user desires to see in an iView. The set of rules may comprise priorities associated with specific types of data to be displayed. Higher priority content may be chosen over lower priority content when a resolution of a mobile device is limited (e.g., less than that of a conventional computer screen) and therefore, only a limited amount of data may be displayed. Priorities may be based on a role (e.g. business function) of a user. For example, the modifications may be based on a predetermined set of rules such as, but not limited to, if a resolution of a device is less than x by y, then remove column z from being viewed. Priorities may be created using an editor such as the editor described with respect to FIG. 5.

Figure 2:
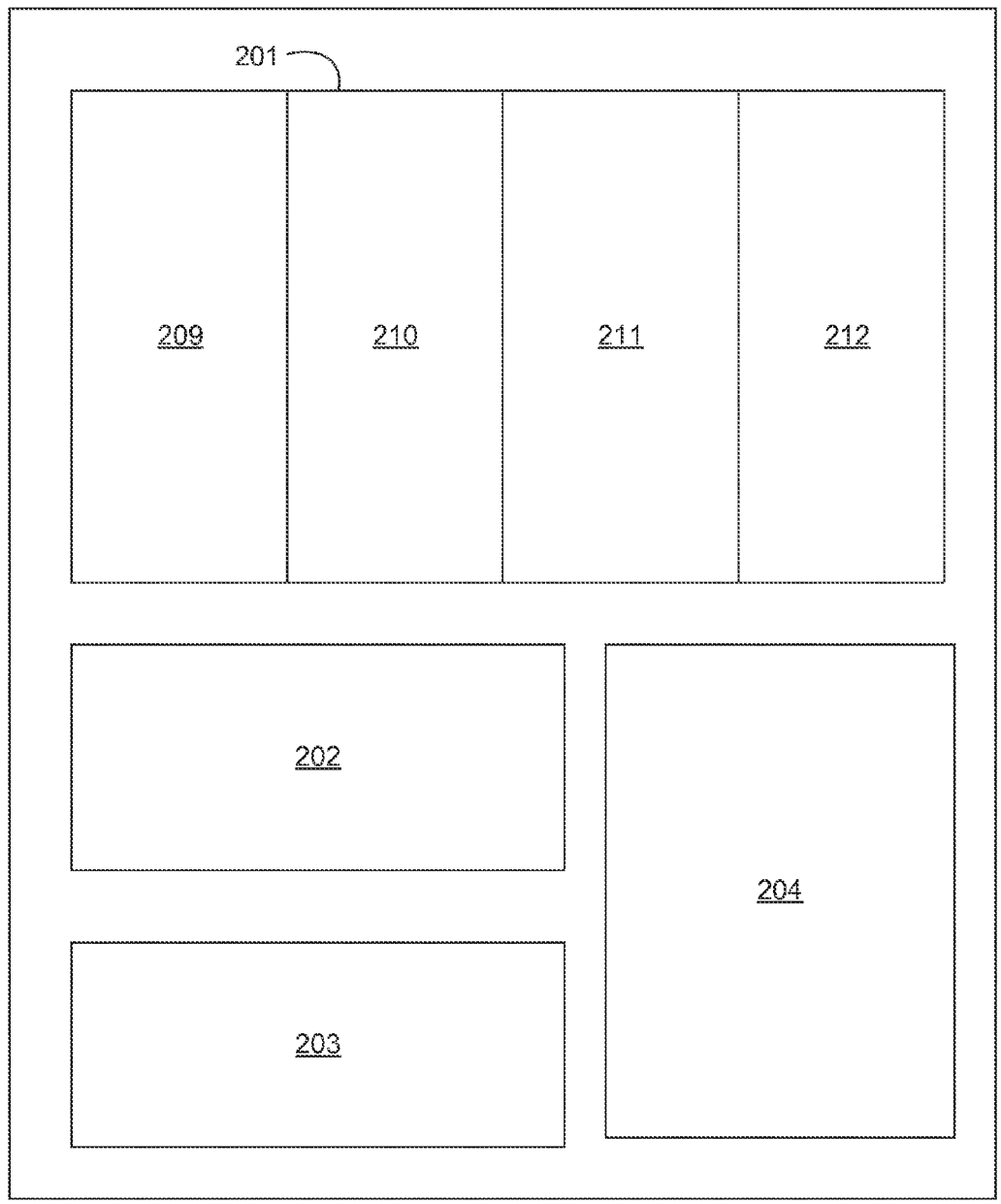
FIG. 2 illustrates a web portal according to some embodiments.

For illustrative purposes, and to aid in understanding features of the specification, an example will now be introduced. This example is not intended to limit the scope of the claims. For example, and now referring to FIG. 2, a user has a need to view a web portal 200 that comprises a plurality of iViews 201/202/203/204. In some embodiments, FIG. 2 illustrates the web portal 200 as viewed on a desktop or laptop computer. However, the user may want to view the web portal 200 on a mobile device such as a phone or a tablet. A computing system hosting the portal (e.g., a portal framework system) may query the mobile device to determine a screen resolution associated with the mobile device.

Once the screen resolution of the mobile device is determined, content associated with iViews to be displayed is determined based on the resolution of the mobile devise as well as the role of the user. For example, iView 201 may comprise four different regions 209/210/211/212. In the present example, regions 209/210/211/212 may comprise real-time information associated with a plurality of sales regions (e.g., region A 209, region B 210, region C 211, and region D 212). The information associated with iView 201 may be in the form of columns of a table, graphs, charts, and/or streaming data. In the present example, the user may be a sales manager of region A and a backup sales manager of region D. Therefore, it may be determined based on a set of rules that the information to be displayed to the user, when viewed on a mobile device, in iView 201 is region A 209 and region D 212. Furthermore, it may be determined that iView 202 is also information that the user needs to view while mobile.

Referring back to FIG. 1, at 102, the iView is modified based on the determined adjustment. In some embodiments, modifying the iView may be based on a CSS associated with the iView. CSS may be used for describing a look and format of a document written in a language such as, but not limited to, HTML or XML. CSS may enable the separation of a document's content from document presentation, including elements such as the layout of the document. By modifying the iView via the CSS, an application that controls the web portal is not affected since the CSS is a layer above the application and the CSS determines what to show or not to show based on the device/role of the user. For example, the CSS associated with the iView 200 may determine the data to be displayed in the iView based on a determined screen resolution and on the rules associated with a role of the user accessing the iView.

In some embodiments, a business expert may delegate privileges/rules to different teams that are responsible for the content of a web portal associated with a particular business area. Privileges may be stored in a database or other data source associated with the portal framework.

Figure 3:
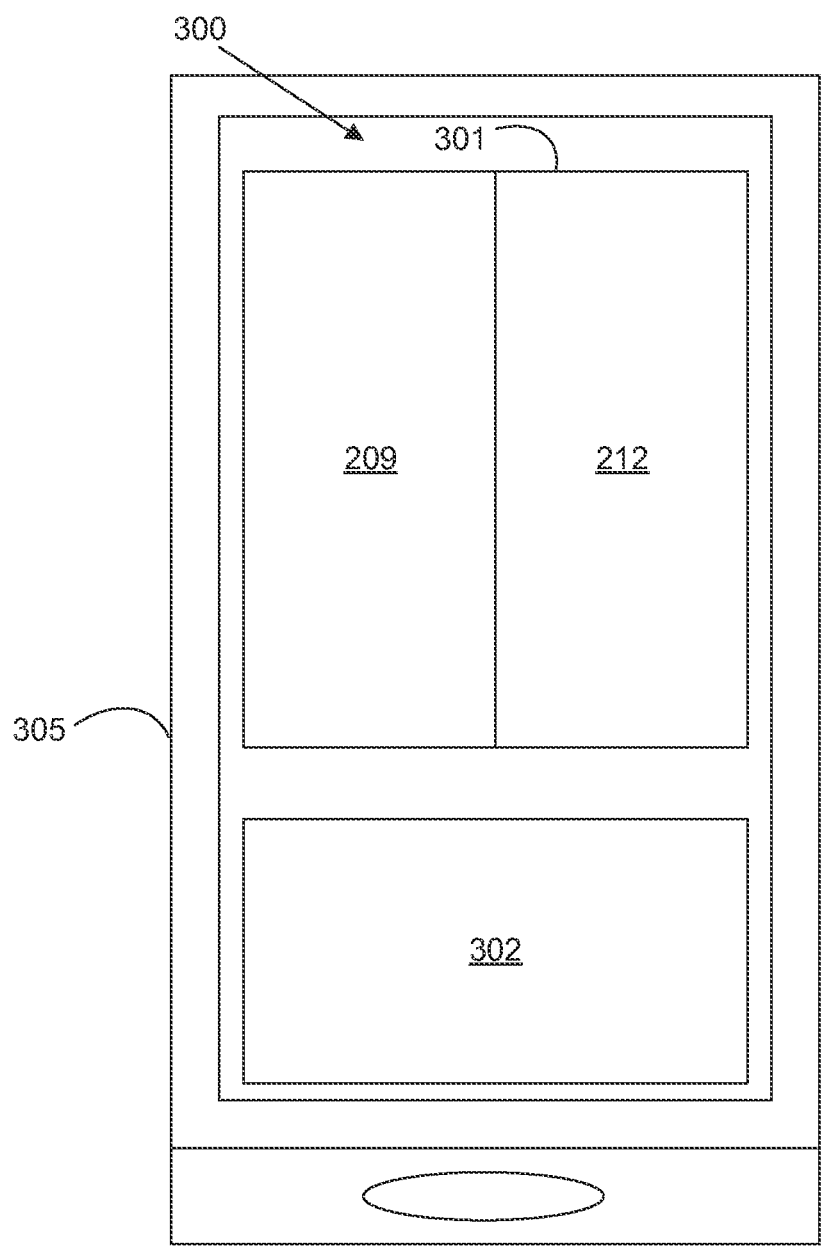
FIG. 3 illustrates a web portal according to some embodiments.

Continuing with the above example, and now referring to FIG. 3, an embodiment of a web portal 300 that may be viewed on a mobile device 305 is illustrated. In contrast to the web portal 200, web portal 300 comprises a first iView 301 and a second iView 302. In some embodiments, iView 301 may correspond to iView 201 of FIG. 2 and iView 302 may correspond to iView 202 of FIG. 2. As illustrated, iView 301 comprises data areas 209 and 212 which, as described in the above example, correspond to the example's region A 209 and region D 212. As illustrated, the user is displayed the iViews that are designated for mobile viewing on a mobile device.

Figure 4:
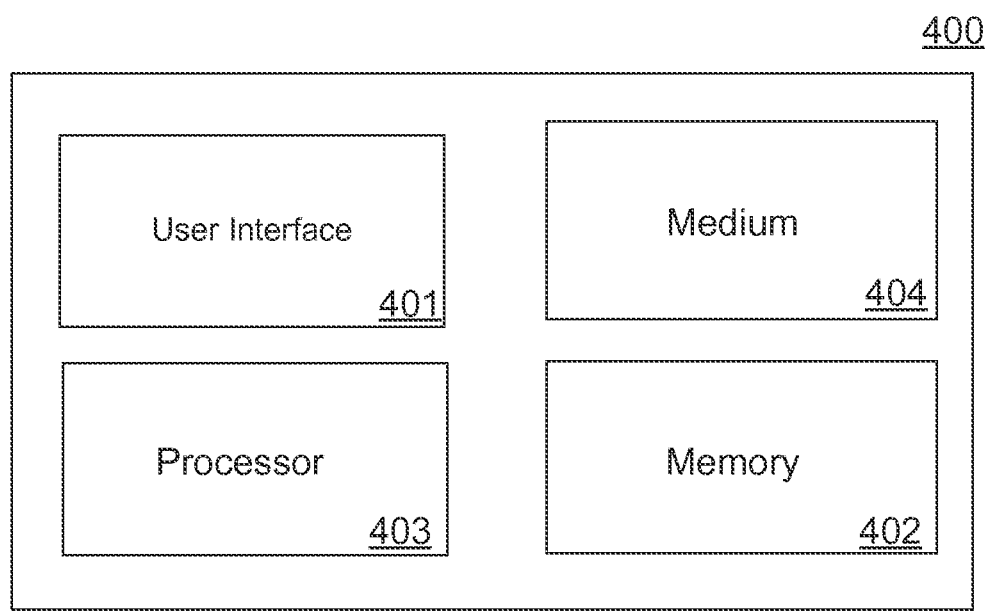
FIG. 4 illustrates a block diagram of a computing system according to some embodiments.

Now referring to FIG. 4, an embodiment of an apparatus 400 is illustrated. The apparatus 400 may comprise a user interface 401, a main memory 402, a processor 403, and a medium 404. According to some embodiments, the apparatus 400 may further comprise a digital display port, such as a port adapted to be coupled to a digital computer monitor, television, portable display screen, or the like.

The user interface 401 may allow users to interact with the apparatus 400 using text commands or with images/graphical icons. In some embodiments, the user interface may comprise a keyboard, mouse, or associated port related thereto. Furthermore, the user interface 401 may comprise a display or a touch screen.

The main memory 402 may comprise any type of memory for storing data, such as, but not limited to, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 402 may comprise a plurality of memory modules.

The processor 403 may include or otherwise be associated with dedicated registers, stacks, queues, etc. that are used to execute program code and/or one or more of these elements may be shared there between. In some embodiments, the processor 403 may comprise an integrated circuit. In some embodiments, the processor 403 may comprise circuitry to perform a method such as, but not limited to, the method described with respect to FIG. 1.

The medium 404 may comprise any computer-readable medium that may store processor-executable instructions to be executed by the processor 403. For example, the medium 404 may comprise a non-transitory tangible medium such as, but is not limited to, a compact disk, a digital video disk, flash memory, optical storage, random access memory, read only memory, or magnetic media.

Figure 5:
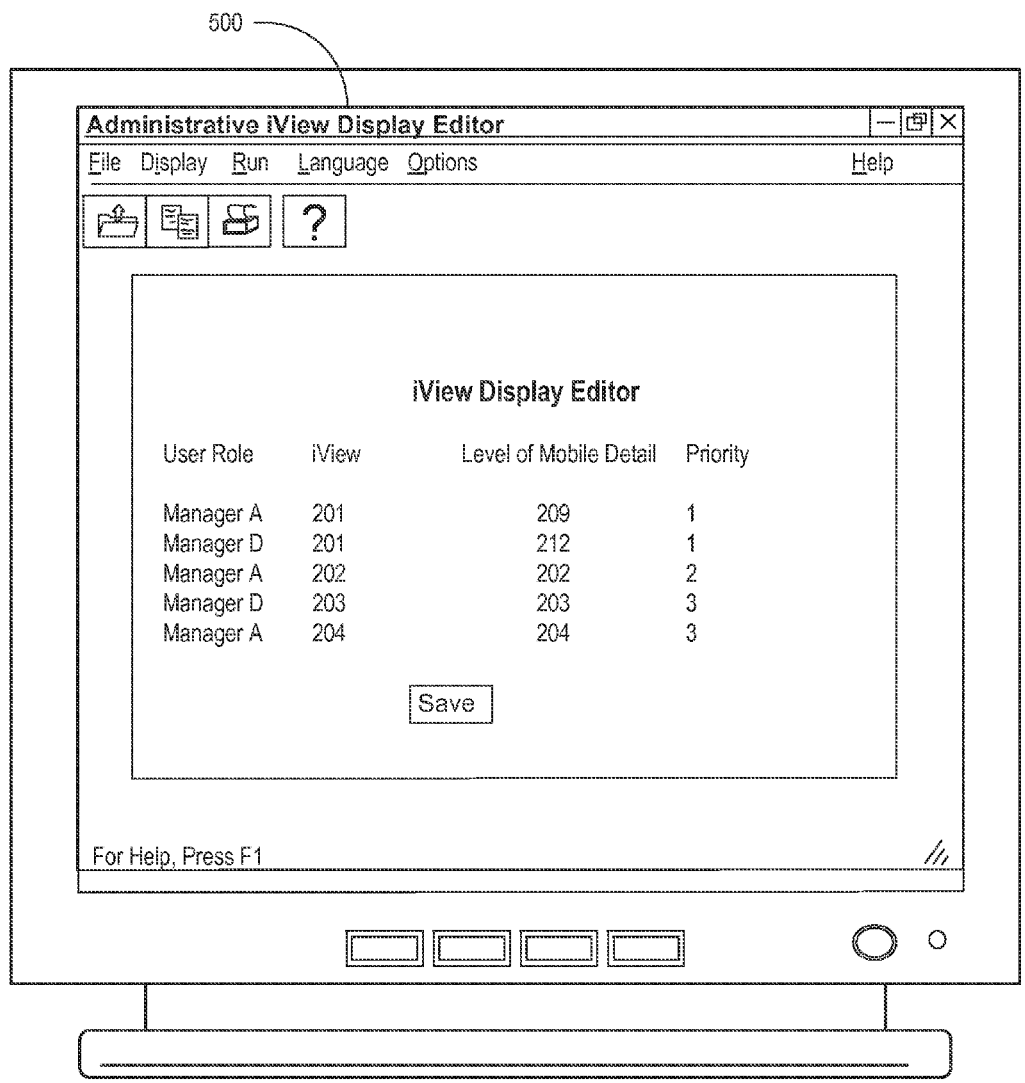
FIG. 5 illustrates an editor according to some embodiments.

FIG. 5 illustrates an administrative iView display editor 500 according to some embodiments. The editor 500 may, for example, let an administrator enter and/or adjust rules and/or content priorities associated with a plurality of iViews and a plurality of user roles. For each user role, a mobile level of detail for a particular iView may be entered and each level of detail may have an associated priority. The editor may enable a layer of styling and rules on top of an application so that a design of the application may be used for different platforms or for different runtime scenarios.

Furthermore, in some embodiments, the editor 500 may comprise a graphical editor and allow a user to select HTML and DOM elements from an application and apply rules regarding the visual enablement and appearance of those elements. The rules may be based on CSS properties such as Media Queries or on role based rules to hide/show elements according to user's assigned roles.

For example, a role of Manager A may need to view element 209 of iView 201 (referring to FIG. 2.). Since this element may be the most important element, it may be given a priority of 1. If it is determined that a screen resolution is large enough, then iView 202 may also be displayed since it has a next lower priority. Elements with lower priorities (e.g. greater than 2) may not be displayed on a mobile device.

Figure 6:
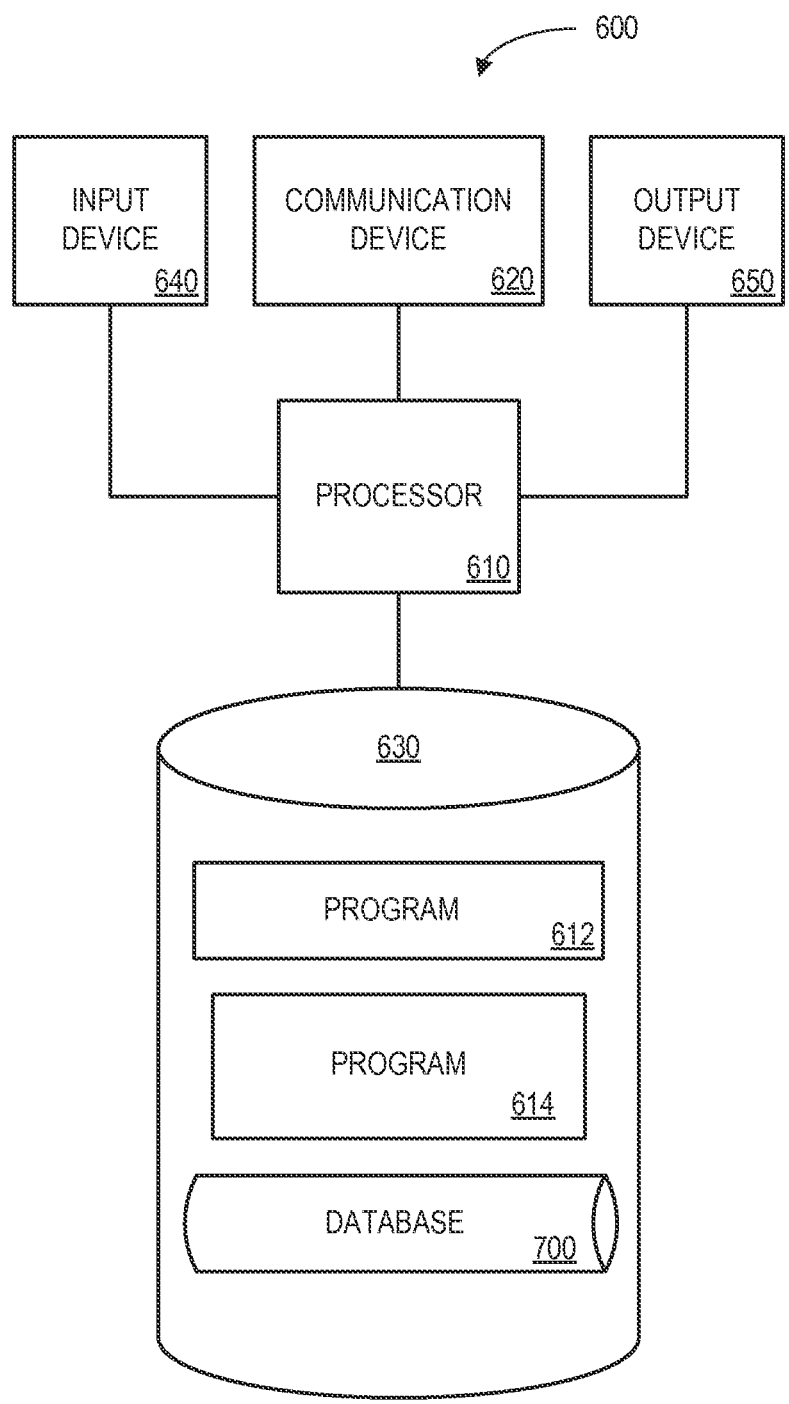
FIG. 6 is a block diagram of an apparatus according to some embodiments.

Now referring to FIG. 6, FIG. 6 is a block diagram overview of an apparatus 600 according to some embodiments. The apparatus 600 may be, for example, associated with a mobile device, such as a phone or tablet. The apparatus 600 comprises a processor 610, such as one or more commercially available Central Processing Units (CPUs) in the form of one-chip microprocessors, coupled to a communication device 620 configured to communicate via a communication network (not shown in FIG. 6). The communication device 620 may be used, for example, as an input path to receive information about user roles. The apparatus 600 further includes an input device 640 (e.g., a touchscreen to navigate an iView) and an output device 650 (e.g., a touchscreen to display an iView).

The processor 610 communicates with a storage device 630. The storage device 630 may comprise any appropriate information storage device, including combinations of magnetic storage devices (e.g., a hard disk drive), optical storage devices, and/or semiconductor memory devices. The storage device 630 stores a program 612 and/or navigation platform 614 for controlling the processor 610. The processor 610 performs instructions of the programs 612, 614, and thereby operates in accordance with any of the embodiments described herein. For example, the processor 610 may determine a screen resolution of the apparatus 600.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

As used herein, information may be "received" by or "transmitted" to, for example: (i) the apparatus 600 from another device; or (ii) a software application or module within the apparatus 600 from another software application, module, or any other source.

In some embodiments (such as shown in FIG. 6), the storage device 630 stores a database 700 (e.g., including information associated with the mobile device.). An example of a database that may be used in connection with the apparatus 600 will now be described in detail with respect to FIG. 7. Note that the database described herein is only an example, and additional and/or different information may be stored therein. Moreover, various databases might be split or combined in accordance with any of the embodiments described herein.

Referring to FIG. 7, a table is shown that represents the iView database 700 that may be stored locally at the apparatus 600 according to some embodiments or at a web server, such as apparatus 400, according to other embodiments. The table may include, for example, entries identifying information about user roles, levels of mobile detail, and priorities associated with one or more iViews. The table may also define fields 702, 704, 706, 708 for each of the entries. The fields 702, 704, 706, 708 may, according to some embodiments, specify: a priority 702, an iView identifier 704, a level of mobile detail 706, and a user role 708. The information in the database 700 may be created and updated, for example, based on data received from a iView Display Editor.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Moreover, while embodiments have been illustrated using particular types of tables and databases, embodiments may be implemented in any other of a number of different ways. For example, some embodiments might be associated with publically available information, such as flight or train schedules available via web sites.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method comprising:
    displaying a web portal comprising a plurality of iViews on a conventional computer screen associated with a desktop or laptop computer; and
    displaying the web portal comprising the plurality of iViews on a mobile device by:
    querying the mobile device to determine a screen resolution;
    determining, via a processor, an adjustment to one of a plurality of iViews to be displayed to a user on the mobile device when the mobile device screen resolution is less than that of the conventional computer screen; and
    modifying the one of a plurality of iViews based on the determined adjustment by removing a portion of the one of the plurality of iViews that is displayed to the user, wherein each portion of the one of the plurality of iViews is assigned a priority level indicating, in part, if the portion may not be displayed on a mobile device and where the removed portion comprises a lower priority then a non-removed portion.

2. The method of claim 1, wherein the determining comprises:
    determining the mobile device's screen resolution.

3. The method of claim 2, wherein determining the mobile device's screen resolution is by a media query.

4. The method of claim 2, wherein modifying comprises:
    adjusting the iView content based on the determined mobile device screen resolution.

5. The method of claim 1, wherein priority is based on a role of the user.

6. The method of claim 5, wherein the removing is based on a cascading style sheet.

7. The method of claim 1, wherein the portion of the one of the plurality of iViews that is removed comprises a table, a graph, a chart, or a data stream.

8. The method of claim 1, wherein the priority level is based on a user role that indicates a mobile level of detail for a particular iView.

* * * * *